（12）United States Patent
Wu

(10) Patent No.: US 8,847,499 B2
(45) Date of Patent: Sep. 30, 2014

(54) PHOTOCELL CONTROLLED LED DRIVER CIRCUIT

(75) Inventor: Mingliang Wu, Piermont, NY (US)

(73) Assignee: RAB Lighting Inc., Northvale, NJ (US)

( * ) Notice: Subject to any disclaimer, the term of this patent is extended or adjusted under 35 U.S.C. 154(b) by 62 days.

(21) Appl. No.: 13/524,246

(22) Filed: Jun. 15, 2012

(65) Prior Publication Data

US 2012/0319591 A1  Dec. 20, 2012

Related U.S. Application Data

(60) Provisional application No. 61/498,238, filed on Jun. 17, 2011.

(51) Int. Cl.
   *H05B 37/02*  (2006.01)
(52) U.S. Cl.
   CPC ............. *H05B 37/0218* (2013.01); *Y02B 20/46* (2013.01)
   USPC ............................ 315/149; 315/291; 315/307
(58) Field of Classification Search
   USPC ......... 315/149–159, 247, 291, 294, 297, 307, 315/308
   See application file for complete search history.

(56) References Cited

U.S. PATENT DOCUMENTS

| 4,394,580 A * | 7/1983 | Gielisse .................... 250/461.1 |
| 7,802,902 B2 | 9/2010 | Moss et al. |
| 8,362,707 B2 * | 1/2013 | Draper et al. ................. 315/291 |
| 2006/0086888 A1 * | 4/2006 | Eash ........................... 250/206 |
| 2011/0062889 A1 | 3/2011 | Hoogzaad et al. |
| 2011/0193491 A1 * | 8/2011 | Choutov et al. ............... 315/291 |
| 2012/0229032 A1 * | 9/2012 | Van De Ven et al. ......... 315/151 |

FOREIGN PATENT DOCUMENTS

WO    2007097496 A1    8/2007

OTHER PUBLICATIONS

ST, Application Note AN3022, 100 W transition-mode PFC pre-regulator with the L6564, Dec. 2010, pp. 1-32, www.st.com.
ST, L6564, 10 pin transition-mode PFC controller, Sep. 2009, pp. 1-34, www.st.com.

* cited by examiner

*Primary Examiner* — Tung X Le
(74) *Attorney, Agent, or Firm* — SmithAmundsen LLC; Dennis S. Schell; Kelly J. Smith

(57) ABSTRACT

An illustrative LED driver circuit includes an automatic on and off control function using a light sensing circuit having a light sensing element reacting to ambient light. The circuit uses flyback converter topology and a power factor correction (PFC) controller. The light sensing function is provided by coupling the light sensing circuit to a monitoring/disable function of the PFC controller, thus providing automatic on and off control of the LED driver circuit by using a light sensing element such as a photocell.

7 Claims, 3 Drawing Sheets

PHOTOCELL CONTROLLED LED DRIVER CIRCUIT

CROSS-REFERENCE TO RELATED APPLICATIONS

This application is a non-provisional of U.S. Provisional Patent Application 61/498,238, filed Jun. 17, 2011, and titled Photo Cell Controlled LED Driver, which is entirely incorporated herein by reference.

BACKGROUND

The present invention relates to LED driver circuits, and particularly, to an LED driver circuit incorporating automatic on and off control based on ambient light sensing.

Automatic on and off control of lighting based on ambient light sensing is advantageous in providing desired light switching in applications such as emergency back-up lighting and dusk-to-dawn security or architectural lighting. One prior art design for a light driver includes driver integrated circuits providing the required light supply signals and a microcontroller to provide control logic and other functionality required for driving the lights. An I/O port of the microcontroller is coupled to a luminous detection circuit, including a cadmium sensor, a photo diode, or a phototransistor, and provides on and off control of the light depending on the ambient light detected by the luminance detection circuit.

One type of driver circuit for LED lighting utilizes a power factor correction (PFC) controller, for example, a current-mode PFC controller operating in transition mode, and a flyback converter providing an isolated, low cost, low component count voltage to LEDs. Such PFC controllers packaged as an integrated circuit can include a monitor/disable input used to detect and provide protection, for example, from overvoltage of the PFC pre-regulator and/or feedback failure. An exemplary monitor/disable input operates as an output voltage monitor and disables the controller if the voltage drops below a particular threshold, thus providing the potential for on and off control via a voltage control signal.

It is desirable to provide on and off control of an LED driver circuit utilizing a PFC controller based on ambient light detection without having to increase the integrated circuit part count and cost of implementing typical control schemes disclosed by the prior art, such as the inclusion of a microcontroller providing I/O ports and logic to support such on and off control.

SUMMARY

The present invention may comprise one or more of the features recited in the attached claims, and/or one or more of the following features and combinations thereof.

An illustrative LED driver circuit includes an automatic on and off control function using a light sensing circuit having a light sensing element reacting to ambient light. The circuit uses flyback converter topology and a power factor correction (PFC) controller. The light sensing function is provided by coupling the output of the light sensing circuit to a PFC controller monitoring/disable input, thus providing easily implemented on and off control of the LED controller, and thus the LED driver circuit output. For example, a light sensing element such as a photocell having a resistance that varies with ambient light (e.g., a photoresistor or light dependent resistor (LDR)) can be used in a voltage divider to provide a voltage output signal that varies with ambient light. LED(s) commonly refers to light emitting diodes, however, herein LED more broadly refers to light emitting semiconductor devices, including for example, but not limited to, light emitting diodes and laser diodes.

One illustrative LED driver circuit with automatic on and off ambient light control includes a power factor correction controller, the controller including a disable input that enables/disables an output of the LED driver circuit; and a light sensing circuit including a light sensing element, an output of the light sensing circuit changing based on the light sensing element responding to changes in ambient light, the output of the light sensing circuit coupled to the disable input of the controller; wherein the output of LED driver circuit is enabled/disable in response to the ambient lighting. The light sensing element can be, for example, a photocell. The illustrative LED driver circuit can further include a flyback converter, the output of the LED driver circuit provided by the flyback converter.

In a first illustrative embodiment of the LED driver circuit, the light sensing circuit further includes a first resistor and a first capacitor in parallel and defining a first and second node, the light sensing element coupled to the first node and an opposite terminal defining a third node, the second node coupled to a ground, the third node coupled to a voltage supply, and the first node defining the output of the light sensing circuit.

In a second illustrative embodiment of the LED driver circuit, the light sensing circuit further includes a first and second resistor, a first capacitor, and a first transistor, the first resistor and first capacitor in parallel and defining a first and second node, the light sensing element coupled to the first node and an opposite terminal defining a third node, the transistor having a base, emitter, and collector, the base coupled to the first node, the emitter coupled to the second node, the collector forming a fourth node, the second resistor coupled between the fourth node and the third node, the second node coupled to a ground, the third node coupled to a voltage supply, and the fourth node defining the output of the light sensing circuit.

In a third illustrative embodiment of the LED driver circuit the light sensing circuit further includes a first, second, and third fourth resistor, a first capacitor, and a first operational amplifier, the first resistor and first capacitor in parallel and defining a first and second node, the light sensing element coupled to the first node and an opposite terminal defining a third node, the operational amplifier having an output, an inverting input, and a non-inverting input, the inverting input coupled to the first node, the non-inverting input defining a fourth node, the second resistor coupled between the fourth node and the third node, the third resistor coupled between the fourth node and the second node, the second node coupled to a ground, the third node coupled to a voltage supply, and the output of the operational amplifier defining the output of the light sensing circuit.

In a fourth illustrative embodiment of the LED driver circuit the light sensing circuit further includes a first, second, third, and fourth resistor, a first capacitor, and a first operational amplifier, the first resistor and first capacitor in parallel and defining a first and second node, the light sensing element and the fourth resistor in parallel and coupled to the first node and an opposite terminal defining a third node, the operational amplifier having an output, an inverting input, and a non-inverting input, the inverting input coupled to the first node, the non-inverting input defining a fourth node, the second resistor coupled between the fourth node and the third node, the third resistor coupled between the fourth node and the second node, the second node coupled to a ground, the third node coupled to a voltage supply, and the output of the operational amplifier defining the output of the light sensing circuit.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
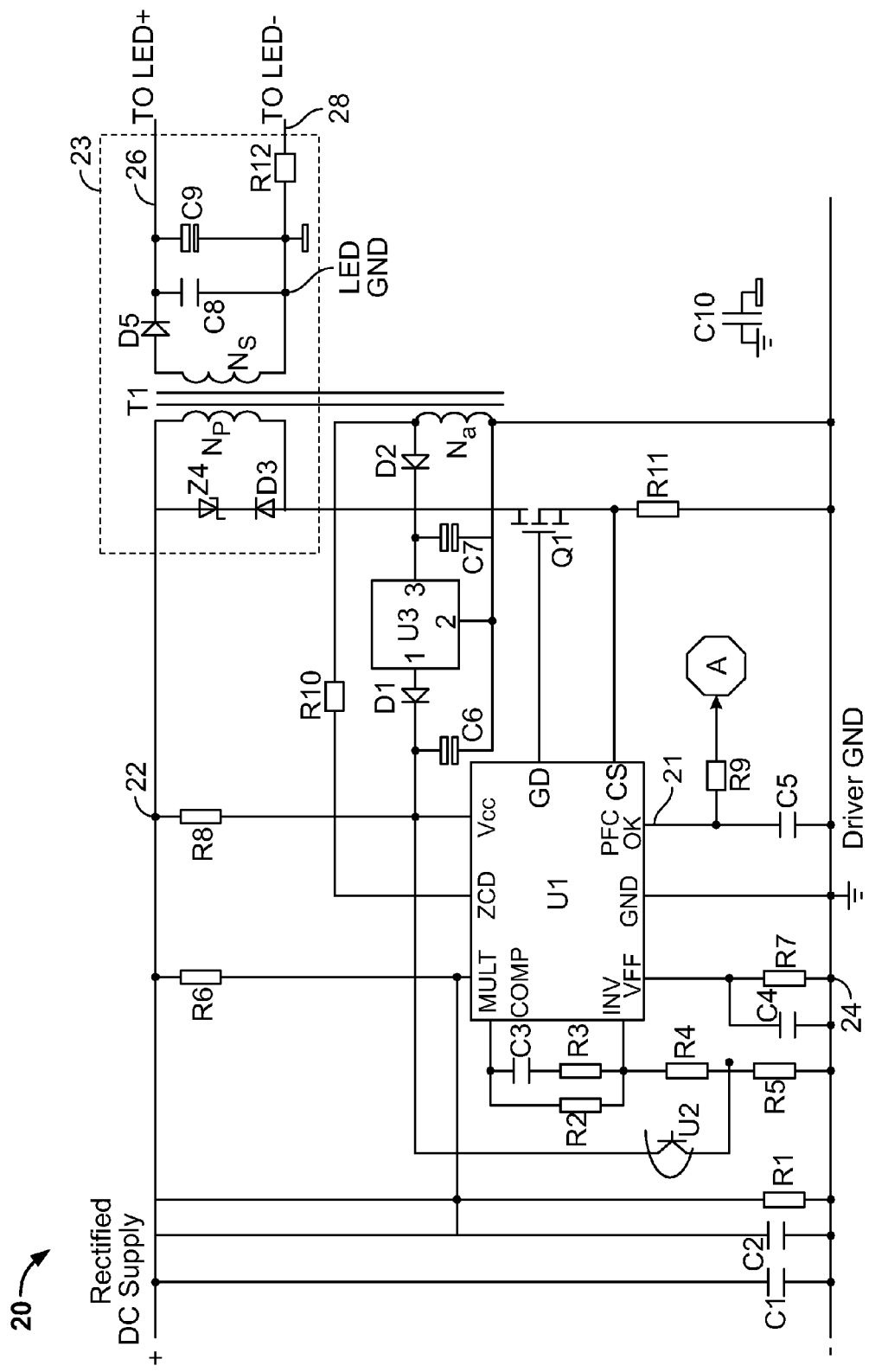
FIG. 1 is a schematic diagram of an illustrative LED driver circuit according to the present invention.

For the purposes of promoting and understanding the principals of the invention, reference will now be made to one or more illustrative embodiments illustrated in the drawings and specific language will be used to describe the same.

An illustrative LED driver circuit 20 includes an automatic on and off control function using a light sensing circuit 30a, 30b, 30c, or 30d having a light sensing element PC reacting to ambient light. The circuit uses a flyback converter 23 and a power factor correction (PFC) controller U1. The light sensing function is provided by coupling the output 38 of the light sensing circuit 30a-30d to a PFC controller monitoring/disable input 21, thus providing easily implemented on and off control of the controller U1, and thus the LED driver circuit output 26 and 28. For example, a light sensing element PC such as a photocell having a resistance that varies with ambient light (e.g., a photoresistor or light dependent resistor (LDR)) can be used in a voltage divider to provide a voltage output signal 38 that varies with ambient light. Other photo sensing elements known in the art can also be used, for example, photo sensing elements that respond to ambient light with changes in resistance, voltage, or current, for example, photo transistors.

Universal Power Line LED Driver

A power line LED driver circuit 20 is shown on FIG. 1 and uses typical flyback converter topology 23 and a power factor correction (PFC) circuit, implemented in the illustrative embodiment with a PFC controller, for example IC L6564 available from STMicroelectronics of Coppell, Tex. The LED driver circuit shown in FIG. 1 is universal in that the power input across nodes 22 and 24 can be a 120V to 277V AC line input or a DC supply input. Optocoupler U2 provides an LED output feedback signal, and can be voltage or current feedback provided to the PFC controller U1. Power supply U3 is a 15V dc supply for PFC controller U1.

PFC controller U1 in the illustrative embodiment, L6564, is a ten pin IC device having pin functions common to such controllers, including devices L6561 and L6562: Pin 1 (INV), pin 2 (COMP), pin 3 (MULT), pin 4 (CS), pin 7 (ZCD), pin 8 (GND), pin 9 (GD), pin 10 (Vcc). PFC controller U1 pin 5 (VFF) can be used for brownout (AC main under voltage) protection. PFC controller U1 pin 6 (PFC_OK), labeled with reference numeral 21, can be used for output voltage monitoring. PFC controller U1 pin 6 has two control levels: at about the 2.4V level and at about the 0.25V level. For example, the output of the PFC controller U1 is disabled when the voltage level at pin 6 exceeds 2.5V or falls below 0.23V. Thus, either control level could be used for on and off control of the output supply 26 and 28 of LED driver circuit 20.

In the illustrative embodiment, the 0.25V level is selected for on and off control from a light sensing circuit 30a, 30b, 30c, or 30d, and the output of the light sensing circuit 32 is thus coupled through resistor R9 at node 21 with U1 pin 6. When the voltage at node 21 is below 0.23V, the output of PFC controller U1 is disabled. To restart PFC controller U1 and reenable the output, and thus the LED supply output 26 and 28, the voltage at node 21 (U1 pin 6) must be above 0.27V. For safe control, the illustrative light sensing circuit 30a can be designed to have a low voltage signal (off control) below 0.20V and high voltage control signal (on control) below 2.0V and above 0.30V.

Light Sensing Circuit

Many types of ambient light sensors are available for photo sensing element PC (FIGS. 2-5). In the illustrative embodiment, a low cost photocell, a light sensitive variable resistor, e.g., a light dependent resistor (LDR), is used to enable the light sensing circuit 30a-30d to provide a control signal at node 38 that varies based on the ambient light. If Rp represents the resistance of photocell PC, then Rp=f(light).

During daylight, when light is directed onto the photocell PC, Rp can be less than 1 k ohm. In contrast, at night time, when little to no light is directly onto the photocell, Rp can be higher than 1M ohm. The changes of resistor value due to the light intensity changing can be used as the basis of the on and off control signal at node 38 for the LED driver circuit 20.

Figure 2:
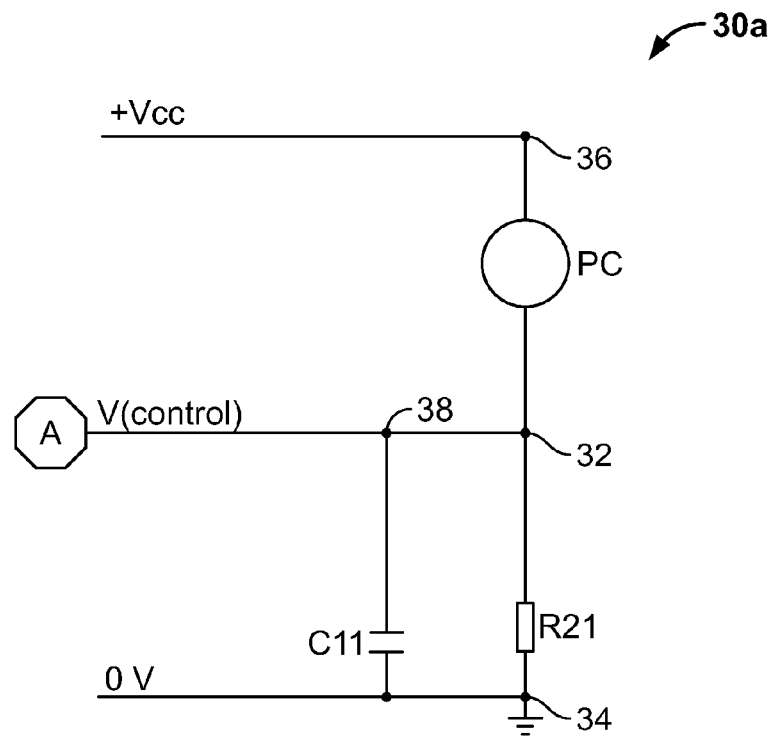
FIG. 2 is a schematic diagram of a first illustrative light sensing circuit for use with the LED driver circuit of FIG. 1.

FIG. 2 illustrates a first illustrative light sensing circuit 30a for use with the LED driver circuit 20 of FIG. 1. Advantageously, light sensing circuit 30a is a simple circuit using few and inexpensive components for providing a controls signal based on the ambient light sensed by the photocell PC to the LED driver circuit 20, using the configuration of a simple voltage divider, with the photocell PC coupled between a reference/supply voltage Vcc at node 36 and the V(control) signal at node 32, and a capacitor C11 and fixed resistor R21 in parallel between V(control) signal at node 32 and the reference ground 34.

The value of components and features reference voltage Vcc, resistor R21, and capacitor C11 of light sensing circuit 30a can be selected depending on the particular application. For example, if using an on and off signal control level of about 2.5V for PFC controller U1 pin 6 (node 21), then if selecting Vcc=+5V and Resistor R21+100 k ohm, V(control) 38 can be above 4.5V at day time and less than 0.5V at night. Capacitor C11 is used to limit noise for the control signal output. For a one second time constant, t=R21*C11, C11=t/R21=1/100 k=10 uF. Alternatively, for an on and off signal control level of about 0.25V at PFC controller U1 pin 6, resistor R21 can be 470 ohm. This configuration provides a positive control logic, i.e., V(control) 38 higher at day time with bright ambient light conditions, and V(control) 38 lower at night time with dark ambient light conditions.

Figure 3:
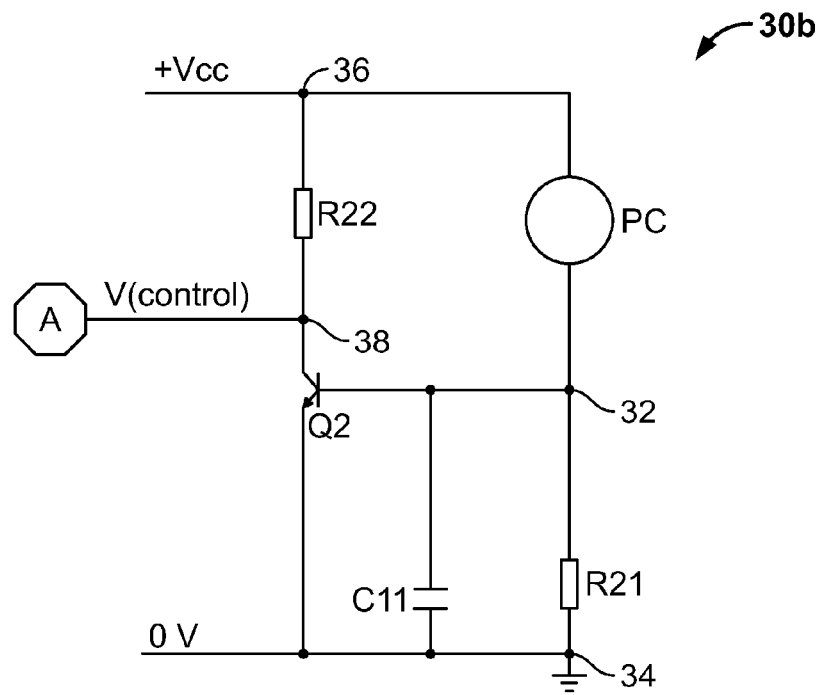
FIG. 3 is a schematic diagram of a second illustrative light sensing circuit for use with the LED driver circuit of FIG. 1.

FIG. 3 illustrates a second illustrative light sensing circuit 30b for use with the LED driver circuit 20 of FIG. 1. The light sensing circuit 30b of FIG. 3 can provide a reverse control logic voltage level, i.e. V(control) 38 lower in bright ambient light conditions and V(control) higher in dark ambient light conditions. Photocell PC is coupled between the reference/supply voltage Vcc at node 36 and the base of transistor Q2 at node 32, and a capacitor C11 and fixed resistor R21 are coupled in parallel between the base of transistor Q2 at node 32 and the reference ground 34, the emitter of transistor Q2 is coupled to the reference ground and resistor R22 is coupled between the supply voltage Vcc at node 36 and the collector of transistor Q2.

This configuration for light sensing circuit 30b is able to provide a signal control level from the collector node 38 of transistor Q2 at PFC controller pin 6 (node 21) of about 2.5V; however, because transistor Q2 has a saturation voltage, the light sensing circuit 30b of FIG. 2 may not be preferred in the case of electing a low voltage control signal at PFC controller pin 6 (node 21), i.e., signal control level that is about 0.25V or below.

Figure 4:
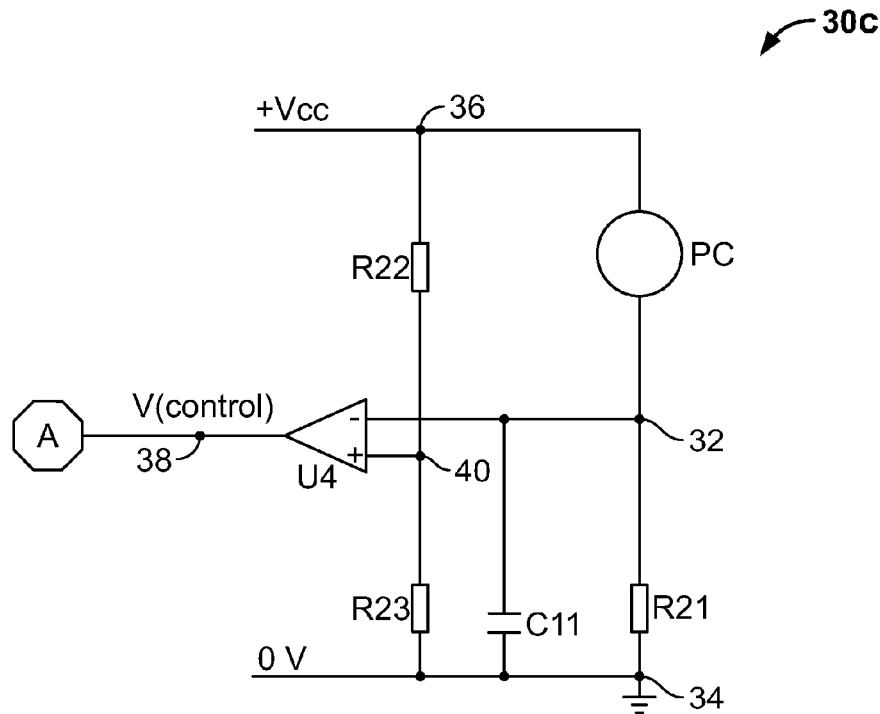
FIG. 4 is a schematic diagram of a third illustrative light sensing circuit for use with the LED driver circuit of FIG. 1.

FIG. 4 illustrates a third illustrative light sensing circuit 30c for use with the LED driver circuit 20 of FIG. 1. An operational amplifier U4 is used in the circuit 30c of FIG. 4. This circuit can provide a signal control level voltage of either 2.5 V or 0.25V available for PFC controller U1 at pin 6 (node 21), with positive or reverse control logic. Resistors R22 and R23 provide a voltage divider circuit and output comparison voltage.

Specifically, in light sensing circuit 30c, photocell PC is coupled between the reference/supply voltage Vcc at node 36 and the inverting input of op amp U4 at node 32, and a capacitor C11 and fixed resistor R21 are coupled in parallel between the base of transistor Q2 at node 32 and the reference ground 34, the emitter of transistor Q2 is coupled to the reference ground and resistor R22 is coupled between the supply voltage Vcc at node 36 and the collector of transistor Q2.

Control Without a Photocell

Figure 5:
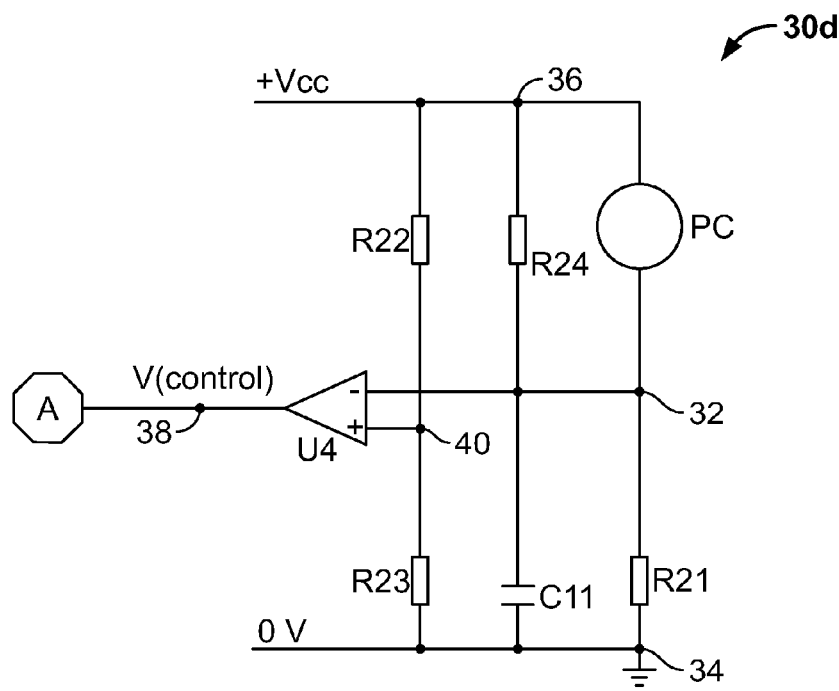
FIG. 5 is a schematic diagram of a fourth illustrative light sensing circuit for use with the LED driver circuit of FIG. 1.

Referring to FIG. 5, a third illustrative light sensing circuit 30d for use with the LED driver circuit 20 of FIG. 1 is illustrated. The light sensing circuit 30d is similar to that shown in FIG. 4 and discussed above except that resistor R24 with 1M ohm value is added across nodes 32 and 36, thus in parallel with photocell PC. In this case, the LED driver circuit 20 functions normally without photocell PC because resistor R24 replaces the photocell position. With photocell PC included in the circuit 30d, resistor R24 will not affect the control function as compared to light sensing circuit 30c.

Power Supply Vcc for the Light Sensing Circuit

The light sensing circuit 30a-30d only draws a very small current from LED driver circuit 20. For example, the power supply (not shown) to provide the control circuit Vcc at node 36 can be a single rectifier diode plus a filter capacitor, or drawn from another DC supply, for example, from power supply U3. A typical voltage for Vcc can be 3.3V to 15V.

The on and off control signal V(control) 38 provided to PFC controller U1 at pin 6 (node 21), can be based on not only the light sensing circuit 30a-30d, but additionally or alternative can be a function of microprocessor or wireless control determined based on any condition, control signal, or ambient light change, with the PFC controller U1 disable function at pin 6 used to provide the on and off control of the LED driver supplies 26 and 28.

While the invention has been illustrated and described in detail in the foregoing drawings and description, the same is to be considered as illustrative and not restrictive in character, it being understood that only illustrative embodiments thereof have been shown and described and that ail changes and modifications that come within the spirit and scope of the invention as defined in the claims and summary are desired to be protected.

The invention claimed is:

1. An LED driver circuit with automatic on and off ambient light control, comprising:
a power factor correction controller, the controller including a monitor input that enables/disables an output of the LED driver circuit; and
a light sensing circuit including a light sensing element and a voltage divider, an output of the light sensing circuit changing based on the light sensing element responding to changes in ambient light, the output of the light sensing circuit coupled to the monitor input of the controller; and
wherein the output of LED driver circuit is enabled/disabled in response to the changes in ambient light.

2. The LED driver circuit of claim 1, wherein the light sensing element includes a photocell.

3. The LED driver circuit of claim 1, further comprising a flyback converter, and where the output of the LED driver circuit is provided by the flyback converter.

4. An LED driver circuit with automatic on and off ambient light control, comprising:
a power factor correction controller, the controller including a monitor input that enables/disables an output of the LED driver circuit; and
a light sensing circuit including a light sensing element, an output of the light sensing circuit changing based on the light sensing element responding to changes in ambient light, the output of the light sensing circuit coupled to the monitor input of the controller; and
wherein the output of the LED driver circuit is enabled/disabled in response to the changes in ambient light;
wherein the light sensing circuit further comprises a first resistor and a first capacitor in parallel and defining a first and second node, the light sensing element coupled to the first node and an opposite terminal defining a third node, the second node coupled to a ground, the third node coupled to a voltage supply, and the first node defining the output of the light sensing circuit.

5. An LED driver circuit with automatic on and off ambient light control, comprising;
a power factor correction controller, the controller including a monitor input that enables/disables an output of the LED driver circuit; and
a light sensing circuit including a light sensing element, an output of the light sensing circuit changing based on the light sensing element responding to changes in ambient light, the output of the light sensing circuit coupled to the monitor input of the controller; and
wherein the output of the LED driver circuit is enabled/disabled in response to the changes in ambient light;
wherein the light sensing circuit further comprises a first and second resistor, a first capacitor, and a first transistor, the first resistor and first capacitor in parallel and defining a first and second node, the light sensing element coupled to the first node and an opposite terminal defining a third node, the transistor having a base, emitter, and collector, the base coupled to the first node, the emitter coupled to the second node, the collector forming a fourth node, the second resistor coupled between the fourth node and the third node, the second node coupled to a ground, the third node coupled to a voltage supply, and the fourth node defining the output of the light sensing circuit.

6. An LED driver circuit with automatic on and off ambient light control, comprising:
a power factor correction controller, the controller including a monitor input that enables/disables an output of the LED driver circuit; and
a light sensing circuit including a light sensing element, an output of the light sensing circuit changing based on the light sensing element responding to changes in ambient light, the output of the light sensing circuit coupled to the monitor input of the controller; and wherein the output of the LED driver circuit is enabled/disabled in response to the changes in ambient light;

wherein the light sensing circuit further comprises a first, second, and third resistor, a first capacitor, and a first operational amplifier, the first resistor and first capacitor in parallel and defining a first and second node, the light sensing element coupled to the first node and an opposite terminal defining a third node, the operational amplifier having an output, an inverting input, and a non-inverting input, the inverting input coupled to the first node, the non-inverting input defining a fourth node, the second resistor coupled between the fourth node and the third node, the third resistor coupled between the fourth node and the second node, the second node coupled to a ground, the third node coupled to a voltage supply, and the output of the operational amplifier defining the output of the light sensing circuit.

7. An LED driver circuit with automatic on and off ambient light control, comprising:

a power factor correction controller, the controller including a monitor input that enables/disables an output of the LED driver circuit; and a light sensing circuit including a light sensing element, an output of the light sensing circuit changing based on the light sensing element responding to changes in ambient light, the output of the light sensing circuit coupled to the monitor input of the controller; and wherein the output of the LED driver circuit is enabled/disabled in response to the changes in ambient light;

wherein the light sensing circuit further comprises a first, second, third, and fourth resistor, a first capacitor, and a first operational amplifier, the first resistor and first capacitor in parallel and defining a first and second node, the light sensing element and the fourth resistor in parallel and coupled to the first node and an opposite terminal defining a third node, the operational amplifier having an output, an inverting input, and a non-inverting input, the inverting input coupled to the first node, the non-inverting input defining a fourth node, the second resistor coupled between the fourth node and the third node, the third resistor coupled between the fourth node and the second node, the second node coupled to a ground, the third node coupled to a voltage supply, and the output of the operational amplifier defining the output of the light sensing circuit.

* * * * *